(12) United States Patent
Mödl et al.

(10) Patent No.: US 6,782,120 B2
(45) Date of Patent: Aug. 24, 2004

(54) METHOD AND SYSTEM FOR GENERATING A KEY RECORD

(75) Inventors: Albert Mödl, München (DE); Elmar Stephan, München (DE); Robert Müller, München (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/275,258
(22) PCT Filed: May 7, 2001
(86) PCT No.: PCT/EP01/05154
§ 371 (c)(1), (2), (4) Date: Mar. 5, 2003
(87) PCT Pub. No.: WO01/86584
PCT Pub. Date: Nov. 15, 2001

(65) Prior Publication Data
US 2003/0156011 A1 Aug. 21, 2003

(30) Foreign Application Priority Data
May 9, 2000 (DE) .......................................... 100 22 570

(51) Int. Cl.$^7$ ................................................ G06K 9/00
(52) U.S. Cl. ...................... 382/124; 382/117; 382/118; 340/5.82; 340/5.83
(58) Field of Search ............................... 382/124, 125, 382/181, 197, 209, 218, 224, 115–118; 713/186; 340/5.82, 5.83; 283/68, 69

(56) References Cited

U.S. PATENT DOCUMENTS

| | | | | |
|---|---|---|---|---|
| 5,719,950 A | * | 2/1998 | Osten et al. | 382/115 |
| 5,787,187 A | * | 7/1998 | Bouchard et al. | 382/115 |
| 5,973,731 A | * | 10/1999 | Schwab | 348/161 |
| 5,987,155 A | * | 11/1999 | Dunn et al. | 382/116 |
| 6,333,988 B1 | * | 12/2001 | Seal et al. | 382/117 |
| 6,549,118 B1 | * | 4/2003 | Seal et al. | 340/5.82 |
| 6,628,810 B1 | * | 9/2003 | Harkin | 382/116 |

OTHER PUBLICATIONS

Williams "Iris Recognition Technology", IEEE, pp. 23–29, 1997.*

* cited by examiner

*Primary Examiner*—Daniel Mariam
(74) *Attorney, Agent, or Firm*—Bacon & Thomas, PLLC

(57) ABSTRACT

It is proposed to combine the advantages of PIN-based protection systems and biometry-based protection systems and avoid the disadvantages of the respective systems by generating the PIN biometrically uniquely. For this purpose it is provided that only characteristic data that are uniquely reproducible are derived from the determined biometric raw data. On the basis of these uniquely reproducible characteristic data a key record is then generated that either constitutes the PIN code or is used to generate the PIN code. The PIN code is thus always reproducible uniquely on the basis of the biometric data. The user need no longer remember the PIN code, and the PIN code cannot be passed on to third parties.

26 Claims, 1 Drawing Sheet

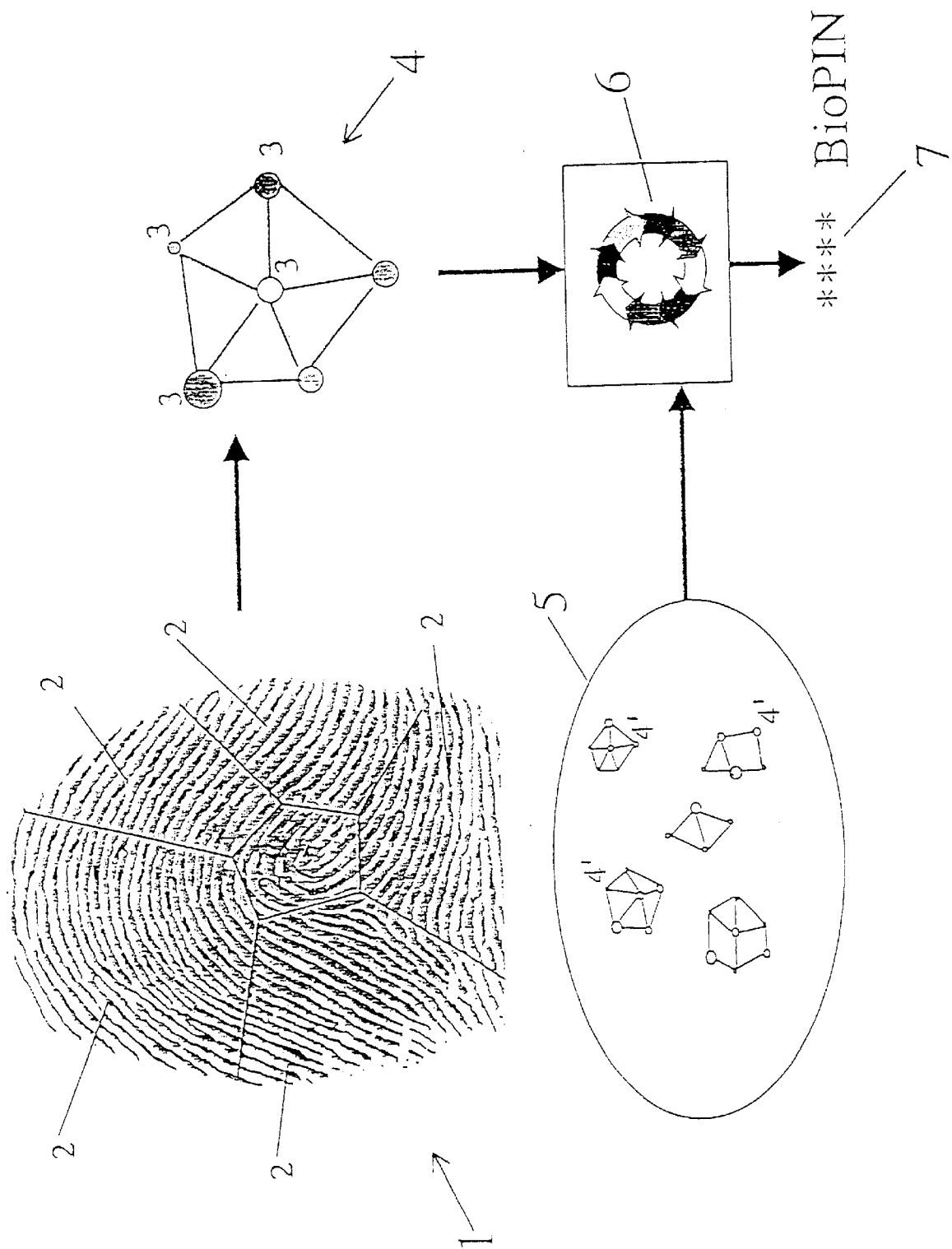

METHOD AND SYSTEM FOR GENERATING A KEY RECORD

BACKGROUND OF THE INVENTION

This invention relates to a method for authenticating a person on the basis of biometric data and in particular to a method for generating a key record for a verification process from this person's biometric data. The invention relates in addition to a system for generating the key record and to a system for authenticating the person on the basis of biometric data.

For identifying or verifying a person, access and admission systems frequently use a key associated with this person and including a discrete record. This may be for example a personal identification number (PIN). The PIN is stored as a reference key either directly in the access-protected system or in a separate data carrier serving as an ID card for the access-protected system. The data carrier can itself constitute an access-protected system, for example a credit card, money card or the like.

A disadvantage of PIN-based systems is that the PIN is easily forgotten and therefore frequently written down, which lowers the system security. Furthermore, PINs are not bound to the person but only relate to the person. That is, the PIN can be passed on to other people or spied out, which uncontrollably increases the group of entitled users. Entry of the PIN with or without presentation of a user card is thus no proof that the legitimate user is present.

These problems do not exist where a biometric physical or behavior-dependent feature of the user is used instead of a PIN for verifying the user's identity. Such biometric features are uniquely bound to the person. They can be neither passed on nor forgotten. A potential third party wanting to procure unauthorized access to the protected system has only a limited number of reference features to present on a trial basis.

A disadvantage of biometric user verification is that the comparison between the stored biometric data and the particular presented biometric data captured by sensor technology is only a comparison in terms of similarity, permitting only a statement about how likely it is that the data being compared match. This is because currently available sensor systems are unsuitable for always deriving the same biometric data from a presented biometric feature with absolutely exact reproducibility. Therefore, a biometric data record stored as a reference record in a smart card, for example, is only tested for a necessary degree of match with a newly captured biometric record in hitherto known authentication or verification methods. In addition, elaborate biometric software with complex biometric algorithms runs in the background during the verification phase. Verification by means of biometric algorithms is thus relatively elaborate.

Biometric user verification is fundamentally more reliable than mere PIN comparison for the abovementioned reasons (user-bound, cannot be forgotten or passed on). However, it is not transferable to conventional security systems with PIN comparison without requiring elaborate changes in the file systems, smart card applications and transaction sequences. With existing applications using PIN verification for user authentication, introducing biometric verification would frequently involve having to replace all cards in circulation, since card application and file system would be new. Further, interventions in the transaction sequence would be necessary so that the online check of the PIN would have to be replaced by an off-line check of e.g. an iris pattern. Furthermore, considerable time and security effort would be needed for carrying out the biometric algorithm and for data transfer, also resulting in difficulties in the standardization and definition of suitable interfaces for open applications.

The problem of the present invention is to overcome the disadvantages of biometric user verification without losing the advantages of biometric user verification over PIN verification.

The invention exploits the fact that although a biometric feature can never be captured by sensor technology completely in the form of uniquely reproducible raw data for generating a reference or verification record, the particular captured raw data have a sufficient number of common features to permit their origin with the same feature bearer to be plausibly proved statistically. Therefore, according to the invention, only a comparatively small number of especially characteristic data, instead of the complete biometric reference or verification data, is obtained from the biometric raw data in order to generate from this characteristic raw record a discrete record as a reference key or verification key record, which is always uniquely reproducible. This discrete key record is then used either directly as a PIN substitute or for generating a unique PIN ("biometrically generated PIN").

The biometrically generated PIN is generated in the terminal where the sensor unit is installed, and transferred to the system as a PIN, optionally protected cryptographically. As with the conventional PIN, it may well happen that several people in the group of users are assigned the same PIN.

It is known from Seal C et al., "Iris Recognition for User Validation," British Telecommunications Engineering, London, GB, Vol. 16, no. 2, July 1997, pages 113–117, to derive a characteristic data record from an iris texture. The parameters form a code that constitutes a unique description of the eye. This code is structured to allow fast comparison with the iris code of authorized users. The described method does not require an exact match to be found. The identification algorithm allows identification even with a mismatch of up to 33%. Since the generated code is consequently not uniquely reproducible, this method is unsuitable for reducing the abovementioned disadvantages.

Generating and using the biometrically generated PIN makes it unnecessary to store a complex biometric reference record on the data carrier card, e.g. a smart card or magnetic card, and/or in the system. The biometrically generated PIN is instead stored and used like a conventional PIN. No interventions in sequence structure and data management of the applications are necessary, so that the biometry can be integrated in particular into existing PIN-based systems and card applications without any special organizational effort. The PIN comparison can remain unchanged in the background system or on the card. Insofar as today's systems provide for the users to be able to define their PINs themselves, cards in circulation can also continue to be used unchanged with a new, biometrically generated PIN. In the transition period, biometric PIN generation can optionally be provided for PIN entry until all systems are equipped with sensors for capturing the characteristic biometric raw data. Optional use of both PIN systems will still be expedient in the future for users with temporarily or permanently poor feature quality. Such users can use classic PIN entry if needed while employing the same interface as biometry users.

Biometric PIN generation involves unique mapping, that is, a person's presented and sensed biometric raw data are always mapped onto the same PIN. The biometri-biometrically generated PIN thus combines the advantages of conventional PINs with biometry while simultaneously overcoming the disadvantages of conventional PIN and biometric systems. The biometric feature used may be for example a fingerprint or the iris structure or any other biometric feature, for example a characteristic behavior pattern of the person, e.g. a dynamic signature, i.e. the relations of for example pressure and/or speed occurring during signing are evaluated.

There are numerous possibilities for generating from characteristic biometric raw data a discrete key record that is always uniquely reproducible and is usable either directly as a PIN code or for generating a multidigit PIN code.

DESCRIPTION OF THE DRAWINGS

In the following some of these possibilities will be explained by way of example in connection with fingerprint verification, the attached FIGURE graphically representing only one possibility.

DESCRITPION OF THE INVENTION

The FIGURE shows direction vector image 1 for the dermal ridges of a fingerprint whose center ("core") is located roughly in the middle of the direction vector image. For deriving characteristic data of the fingerprint, direction vector image 1 is subdivided into areas 2 with similar total orientation whose weighted centroids 3 form linking points for graph 4 derived from the fingerprint. This graph is "fault-tolerant" to a certain extent since its structure is influenced only negligibly by the quality of the sensors used for capturing the fingerprint raw data. That is, the characteristic data derived from the fingerprint or derived graph 4 differs only slightly from other characteristic data derived from the same fingerprint, regardless of the particular raw data actually determined by sensors.

Derived graph 4 is thereupon compared in comparison algorithm 6 with comparative graphs 4' stored in graph data base 5, each comparative graph 4' having a multidigit number associated therewith. After comparison algorithm 6 has been carried out, biometrically generated PIN ("bioPIN") 7 in accordance with the multidigit number affiliated with closest comparative graph 4' is associated with the captured fingerprint and thus to the person to be identified.

According to another example for generating a key record, it is provided that the rough orientation of the dermal ridges of the fingerprint is used as characteristic data of the fingerprint for classifying the fingerprint as a certain fingerprint type on the basis of this rough orientation. The standardized FBI classification system evaluates for this purpose not orientations but relative positions of the centers or delta points. (A delta point is a point around which the lines form a triangular shape). As in the FBI classification system, types can include for example "left loop," "right loop," "whorl," "regular arch," "tented arch," "double loop." However, the FBI classification system with only six classes is too unspecific for the intended purposes and must therefore be extended to at least 1,000, preferably 10,000 or even more, classes, with each class standing for a special PIN code.

A further suitable method for generating a key record is based on the statistical evaluation of biometric raw data that are closely related to the so-called minutiae. Minutiae are characteristic points of a fingerprint, namely line endings and line bifurcations in the fingerprint image. Most fingerprint verification algorithms use these points for purposes of comparison, but for the present invention it is unsuitable to directly use the minutiae because individual minutiae may be no longer present, slightly displaced or newly added in the currently captured image depending on the sensor, lighting conditions, local injuries and other factors. To permit a discrete key record to be generated reproducibly for the purpose of the present invention, the minutiae are evaluated statistically since statistical evaluation is fault-tolerant with respect to specific minutiae. That is, even if the statistical evaluation results are slightly different the evaluation results are still so close to each other that they are within a fault-tolerance limit, so that each evaluation leads to a unique result and thus to a unique key record.

The minutiae can be evaluated statistically in different ways.

a) A template of concentric circles or circular segments can be placed around the center of the fingerprint, and the average number of minutiae within the predepredefined concentric rings or circular segments or segments of the rings determined.

b) The average number of minutiae having a predefined orientation can be determined, the predefined orientation being defined for example by the direction of a connecting line between centers and/or delta points.

c) The standard deviation of the cumulated, weighted distance of all minutiae from the center of the fingerprint can be determined.

These data can then be statistically processed to generate reproducibly unique data from the unique minutiae of a fingerprint, even if individual minutiae were not, or not identically, captured.

Like the minutiae, other characteristic data can also be evaluated statistically, for example the number of dermal ridges between centers and delta points.

On the basis of the biometric raw data, an average line density of the fingerprint image can also be determined, for example by a fast Fourier transform of the image, the determined average line density being used to generate a key record or directly a PIN code.

In corresponding fashion, the local density or the average distance of sweat pores on the dermal ridges can be used as characteristic data from the biometric raw data for generating the key record.

The characteristic data can likewise take into account whether further intermediate lines are present between the actual dermal ridges, which occasionally happens.

Finally, it is possible to perform a pattern classification by fractal image compression and/or by means of neural networks, each class of patterns again having a specific PIN code allocated thereto.

Numerous other variants are possible for obtaining a key record on the basis of characteristic data derived from the biometric raw data, whereby the aforementioned possibilities can also be used in combination.

What is claimed is:

1. A method for generating a key record for a verification process from a person's biometric data, comprising the steps of:

capturing by sensor technology a biometric feature of the person for generating biometric raw data, deriving characteristic data from the biometric raw data, and generating a key record in dependence on the derived characteristic data, wherein only a selection of especially characteristic data is derived from the biometric raw data, and the key record, which is always uniquely reproducible and generated from said characteristic data.

2. The method according to claim 1, wherein a multidigit PIN code is generated by means of the key record.

3. The method according to claim 1 wherein the biometric feature is a fingerprint.

4. The method according to claim 3, wherein the characteristic data are derived by determining a direction vector image of the dermal ridges of the fingerprint by means of the biometric raw data, subdividing the direction vector image into areas of similar total orientation of the papillae, associating with each area a weighted centroid and deriving a graph from the weighted centroids as characteristic data.

5. The method according to claim 4, wherein a key record in the form of a multidigit PIN code is generated from the graph by comparing the derived graph with stored graphs of different shape for maximum similarity, each stored graph having associated therewith a multidigit number that forms the PIN code.

6. The method according to claim 3, wherein the rough orientation of the dermal ridges is determined as characteristic data, and the determined rough orientation is mapped onto one of several orientation classes by a classification method, each orientation class having its own key record associated therewith.

7. The method according to claim 6, wherein the particular key record associated with the orientation classes serves directly as a PIN code.

8. The method according to claim 3, wherein the minutiae of the fingerprint are determined as characteristic data.

9. The method according to claim 8, wherein the characteristic data of the minutiae are evaluated statistically for generating the key record.

10. The method according to claim 9, wherein the average number of minutiae located within predefined concentric circular rings, circular segments or segments of circular rings around the center of the fingerprint are determined in the statistical evaluation.

11. The method according to claim 9, wherein the average number of minutiae having a defined orientation is determined in the statistical evaluation of the minutiae.

12. The method according to claim 9, wherein the standard deviation of the cumulated, weighted distance of all minutiae from the center of the fingerprint is determined in the statistical evaluation of the minutiae.

13. The method according to claim 3, wherein the number of dermal ridges between centers and delta points is taken into account for deriving the characteristic data.

14. The method according to claim 3, wherein the characteristic data are determined by fractal image compression.

15. The method according to claim 3, wherein the average line density of the fingerprint image is determined as characteristic data.

16. The method according to claim 3, wherein the local density and/or the average distance of sweat pores on the dermal ridges is determined as characteristic data.

17. The method according to claim 3, wherein the presence of intermediate lines between the single dermal ridges is taken into account for deriving the characteristic data.

18. The method according to claim 1 wherein the structure of the iris is used as a biometric feature.

19. A method for authenticating a person on the basis of a biometric feature of the person, comprising the steps of:
generating a verification key record or PIN code according to claim 1,
comparing the verification key record with a reference record likewise generated according to claim 1, and
authenticating the person if the verification key record or PIN code identically matches the reference record.

20. The method according to claim 19, wherein the key record or PIN code is stored as a reference record on a data carrier card.

21. A system for generating a key record for a verification process from a person's biometric data, comprising:
sensors for capturing biometric raw data on the basis of a biometric feature of the person,
a device for deriving characteristic data from the raw data, and
a device for generating a key record on the basis of the characteristic data, said device for generating a key record always generating the same key record for differently derived characteristic data by evaluating only a selection of the biometric reference or verification data that have special characteristics.

22. The system according to claim 21, including a data carrier, for example a smart card, on which the key record is stored as a reference record.

23. The system according to claim 21, wherein the key record is a multidigit PIN code.

24. The system according to claim 21, wherein the biometric data are derived from a fingerprint.

25. The system according to claim 21, wherein the biometric data are derived from the structure of an iris.

26. A system for authenticating a person on the basis of biometric data, comprising:
a system according to claim 21,
a comparison device for comparing a key record with a reference record, and
an output device for effecting an authentication of the person if a complete match between key record and reference record is ascertained by the comparison device.

* * * * *